READING AND WRITING DEVICE FOR USE IN MAGNETIC CORE STORAGES

Filed March 6, 1961

INVENTOR
JEAN BORNE
MICHEL AUDEBERT
BY Frank R. Trifari
AGENT

United States Patent Office 3,278,909
Patented Oct. 11, 1966

3,278,909
READING AND WRITING DEVICE FOR USE IN MAGNETIC CORE STORAGES

Jean Borne, Clichy, and Michel Audebert, Paris, France, assignors to North American Philips Company, Inc., New York, N.Y., a corporation of Delaware Filed Mar. 6, 1961, Ser. No. 93,489
Claims priority, application France, Mar. 7, 1960, 820,547
5 Claims. (Cl. 340—174)

Figures 1, 1A:
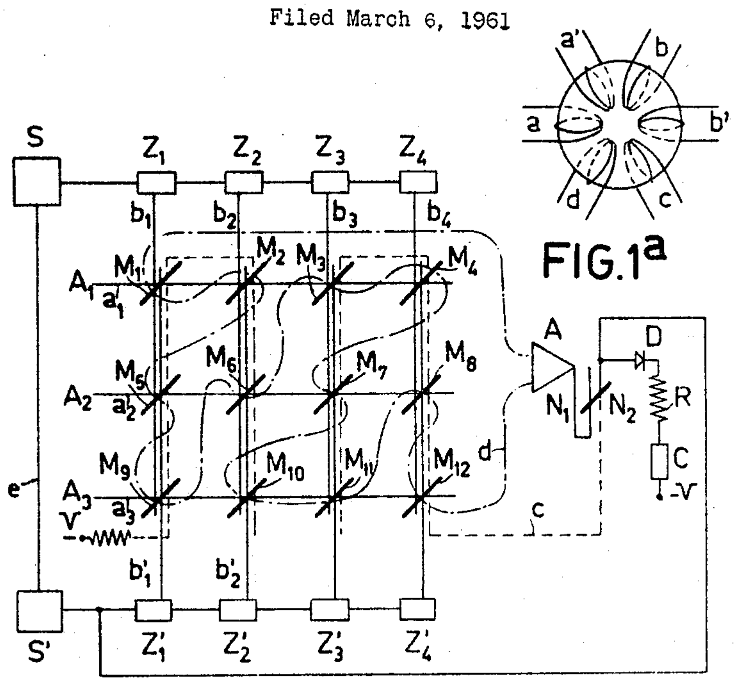

This invention relates to a reading and writing device for use in a matrix storage arrangement preferably comprising magnetic cores; more particularly, the reading and writing device, in one embodiment, encompasses a commutating member constituted by a magnetic core of particularly simple and economic structure.

The primary object of the invention is, in particular, to provide a device of the nature set forth such that the various practical requirements are better fulfilled and that the structure is markedly simplified, resulting in an efficient and economic operation.

Another object of the invention is to selectively read out the information contained in a storage matrix consisting of a plurality of rows and columns of magnetic elements such as cores without losing the stored information; the information contained in a matrix comprising magnetic $xy$ cores or rings provided with suitable windings and arranged in $x$ vertical columns and $y$ horizontal rows in an easy and economical manner by means of the core located at the crossing of a column and a row, without the said information being lost.

According to one aspect of the invention reading is performed by successively scanning each of the vertical columns of the matrix storage, with the selected horizontal row being chosen by causing a current pulse of given amplitude to pass through it; the read information is instantaneously stored in the commutating member according to the invention, which operates at the same time as a storage and the information is then rewritten in the core from which it was taken. In this way loss of the information is avoided.

In furtherance of the above objects, the invention also contemplates a particular selection of the commutating member for instantaneous storage and particular reading members for the storage.

The invention relates mainly to a storage formed by a given number of magnetic cores provided with windings, each core being capable of storing a piece of binary information in either of its extreme states of magnetisation, the reading windings and the writing windings of these cores being connected to respective auxiliary cores which serve as instantaneous storage members and as output members for the storage; the storage is scanned by means of pulses capable of flipping-over successively each storage core to be read thus transferring this information to the auxiliary core, and subsequently flipping-over again the same storage core for rewriting the information in the storage.

The output of the reading circuit of the storage is connected to one winding of the auxiliary magnetic core, and a further winding of the auxiliary core is shunted by the output load and connected to a source of recurrent pulses, which are interlaced with the scanning pulses for the reading operation and serve as the rewrite pulses.

In addition to the aspects mentioned above the invention relates to various further arangements, which may be used concurrently or independently; they will be described more fully hereinafter.

In another aspect of the invention the bistable elements of the storage are scanned by connecting windings of magnetic cores associated with the successive rows of a shift register to predetermined columns of the matrix and by causing a sequence of pulses to pass from one extremity to the other of the said register so that each pulse fed to the input of the register is transmitted to a different column of the storage.

The invention may be used for various purposes, particularly for computers.

The invention will now be described more fully with reference to the accompanying drawing, in which FIG. 1 shows a storage comprising a reading and writing device according to the invention.

FIG. 1*a* shows one of the cores of the said storage.

Figure 2:
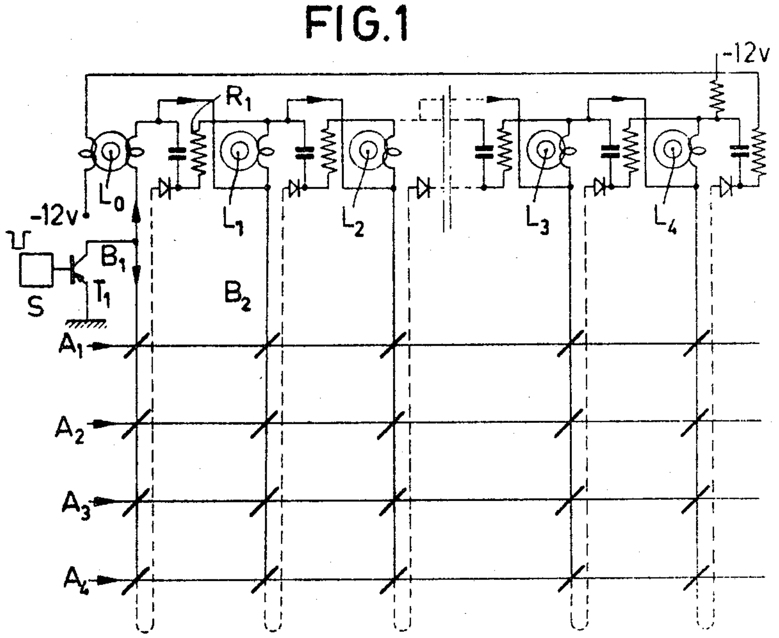

FIG. 2 shows a scanning device for the storage according to the invention.

The matrix storage according to the invention, shown by way of example in FIG. 1, comprises annular magnetic cores arranged in four vertical columns and three horizontal rows; they are designated by $M_1$, $M_2$, . . . $M_{12}$.

Each of these cores, indicated diagrammatically by an oblique dash, includes preferably at least four windings, which are connected to each other as indicated. It is assumed, for example, that each horizontal row contains a binary number, of which the various digits are distributed in accordance with the columns. The technical problem consists in selecting the address or the horizontal row, where the number is to be read (by applying a pulse voltage) by reading successively each digit; the presence or absence of pulses is made operative in a reading circuit which passes through all cores, when a scanning pulse is successively fed to each of the columns, for example from left to right.

It may also be considered that any core of the matrix is to be read by simultaneously applying a scanning pulse to its corresponding row circuit and its corresponding column circuit. It will appear from the following that in order to restore the information after it is read, it is necessary to apply pulses of opposite polarity to these circuits or to use equivalent means for this purpose.

The above-mentioned windings are formed by the following wires:

(1) Address wires $a_1$, $a_2$, $a_3$, every one of which is threaded through all cores of a horizontal row $A_1$, $A_2$ or $A_3$ respectively (indicated in full lines);

(2) Wires $b_1$, $b_2$, $b_3$, $b_4$ every one of which is threaded through all cores of a vertical column B1, B2, B3, B4 respectively (indicated in full lines);

(3) An inhibiting wire $c$, threaded through all cores of the storage (indicated by a broken line);

(4) A reading wire $d$, threaded through all cores of the storage (indicated by a dot-and-dash line).

The wires $a$ may, if desired, be doubled ($a$ and $a'$), whereas the wires $b$ must be necessarily doubled ($b$ and $b'$), as will be explained hereinafter.

An item of information can be written in a core which is in the state 0 by applying a field $+Hc$ capable of changing-over the core from from the state 0 to the state 1. This field may be obtained, for example, by passing through each of the two wires $a$ and $b$ passing through the core concerned a pulse producing a magnetic field of strength $+Hc/2$.

In order to read the information stored in a core, pulses are simultaneously applied to the wires $a$ and $b$ passing through this core, the corresponding currents having an intensity such that each produces a magnetic field of strength $-Hc/2$, these two pulses combined produce in the core at the crossing of the column and the row concerned, a field of strength $-Hc$, which flips-over the core concerned to the state 0, when it was previously in the state 1. At this instant a pulse is induced in the reading wire $d$, which passes through all windings. This pulse is applied through the amplifier A to an intermediate storage member, which, in accordance with the invention is an auxiliary annular magnetic core having two windings N1 and N2. If, on the contrary, the scanned core is in the state 0, the field *—Hc* has only the effect of raising transiently the saturation condition of the core, which does not produce an appreciable current through the reading wire, so that the auxiliary core remains in the state 0.

The winding N1 is fed by the reading amplifier A, whereas the winding N2 receives the pulses supplied by a source S', which supplies pulses interlaced with the reading pulses (source S). These windings are wound so that a current passing through the winding N1 tends to change over the core to the state 1, whereas a current passing through the winding N2 tends to change over the core to the state 0.

The winding N2 is connected to a diode D, connected in series with a resistor R, to which a fixed direct current —v. (for example —12 v.) is fed.

The core associated with N1 and N2 may be changed over to the state 1 by read information, if any. The amplitude of the current pulses passing through the winding N2 depends upon the preceding state of the core in the following manner:

If, for example, the information obtained by reading a core of the matrix indicates that the digit 0 was therein stored, there will be no current through the winding N1 of the core, and the latter therefore remains in the state 0.

The winding N2 at the occurrence of the pulse from the source S' then presents an impedance which is extremely small with respect to the impedance of the resistor R; the amplitude of the current generated by the pulse source S' and passing through this winding is then sufficiently high to provide an inhibiting current across all windings *c* of the cores. Therefore, in the cores previously scanned and still receiving currents at their windings *a'* and *b'* of a sense opposite to that of the currents initiating the reading operation, each producing a field $Hc/2$, there is added a field $—Hc/2$ and therefore, the resultant force $Hc/2+Hc/2—Hc/2=Hc/2$, is generated whereby the said core remains in the state 0 due to the lack of a sufficient magnetic force to effect a change of state. The cores located in matrix positions differeing from those of the core concerned have fields $Hc/2—Hc/2=0$ and those of which the column and the row differ simultaneously from those of the core under consideration, receive only the inhibiting current, i.e. $—Hc/2$. It is apparent that in this case no current pulse will appear across the output impedance C, since the resistor R is substantially short-circuited by the winding N2.

If, on the other hand, the information obtained by reading indicates that the digit 1, was stored, there appears a current across the winding N1, which current changes over the auxiliary core to the state 1. The diode D serves to increase the impedance of the branch D–R during the change-over of the auxiliary core under the effect of the pulse passing through the winding N1, so that this change-over is facilitated.

The current pulse supplied by the source S' through winding N2 brings back the core to the state 0. During this period the winding N2 represents a high impedance with respect to the branch D–R, so that only the current required for the changeover of the core N1–N2 passes, which is insufficient to supply an inhibiting pulse along the wire *c* to the storage matrix; the number of turns of the winding N2 is much greater than that of the windings *d*, which are preferably formed by a single turn. In this case, since the core represents a high impedance, a current pulse is obtained from the output impedance C, which current may be utilized in a computer, of which the storage may form part. Since there is no inhibiting current, a piece of information will therefore be recorded at the crossing of the column and the row each of which receive a current pulse from source S' and amplifier A respectively corresponding to a value of $+Hc/2$ each, just as in the case of writing. This is true since, as shown in FIG. 1, pulse source S' is coupled to the cores of the matrix in a manner similar to source S.

In accordance with a further feature of the invention use is made of at least one shift register comprising successively the elements Z1, Z2, Z3, Z4 to produce the successive scanning pulses for the columns of the matrix. In practice use is made of two of these registers with mutually interlaced pulses: Z1–Z2–Z3–Z4, and Z'1–Z'2, Z'3–Z'4 respectively. The first register serves for the reading operation proper, the second for restoring the information in the storage. For the sake of simplicity only the upper register will be considered. The source S serves to produce a sequence of pulses, each of which results in opening a circuit, which is maintained, so that the following pulse passes each time through a column of a higher rank; for example, a pulse coming from S and passing directly through Z1, practically in short-circuit, finds Z2 practically in open circuit, so that it passes through B2 and the next following pulse passes through Z1–Z2 and finds Z3 in open circuit, so that it passes through B3, and so forth.

Such a shift register is known per se, but in this case it is used for scanning the matrix storage. An example of a specific shift register for use in the instant circuit is shown in FIG. 2 where all cores of the shift register are, initially, in the state 0, with the exception of the core $L_0$, which is in the state 1. The source S supplies successive pulses to the shift register via a transistor $T_1$. These pulses, depending upon the winding sense, tend to change the cores back to the state 0, if they are not already this state. The first pulse, which finds the core $L_0$ practically in open circuit, passes through the column B1 and charges a capacitor C1, while at the same time a small fraction of the pulse current furnished by the transistor T1 causes the core $L_0$ to change over, so that its impedance becomes low for the following pulses (practically short-circuited). The capacitor C1 transfers its charge via the resistor $R_1$ to the core L1, which changes over to the state 1, so that its impedance becomes high (practically open circuit). The following pulse then passes for the major part through the column B2 and so forth. Further details of a typical shift register may be derived from, for example, the book "Digital Computer Components and Circuits," by R. K. Richards, chapter 5.22, page 233.

In the foregoing it was stated that it is necessary to produce, in order to carry out the reading operation, and then the rewriting operation, first fields $—Hc/2$ and then fields $+Hc/2$, the latter being in synchronism with the pulse from the source S' in the bistable elements formed by the elementary magnetic cores.

This may be realized by two equivalent ways in accordance with the invention by doubling the winding on the magnetic cores of the vertical columns in two windings of opposite sense with means to feed each time the suitable winding; the following alternatives may therefore be used: each doubled part of these windings is connected to two corresponding cores of two identical shift registers (replacing the register shown diagrammatically in FIG. 1), but fed respectively by sources supplying interlaced pulses S and S' (this is the solution shown in FIG. 1, in which the interlacing is indicated by the connection 1); each doubled part of these windings may be connected to two consecutive cores of one shift register of double the length fed by a source supplying pulses of double the frequency, equivalent to $S+S'$, these pulses being interlaced.

The recording, for example, of a sequence of digits in the matrix storage, may, of course, be carried out by the same means used for the rewriting, i.e. by feeding the winding N1 directly by the writing pulses, after which the first pulse supplied by the source S provides the recording in the matrix in the successive columns, or use may be made of any equivalent means.

The device according to the invention may be realized by means of various modification readily apparent to those skilled in the art, the above-described arrangements being merely illustrative of the principles of the invention, the scope of which is set forth in the appended claims.

What is claimed is:

1. A magnetic memory system comprising a plurality of magnetic matrix memory elements arranged in a matrix including rows and columns, each matrix memory element being capable of assuming at least two stable magnetic states, each matrix memory element having magnetically coupled thereto a plurality of windings comprising read, write and inhibit windings, an auxiliary magnetic memory element, said auxiliary element having magnetically coupled thereto a first winding and a second winding, said first winding being coupled to a read wire connecting all of said read windings, said second winding being coupled to an inhibit wire connecting all of said inhibit windings, means for selectively applying read pulses of a predetermined polarity to the matrix memory elements for reading out the information stored therein, means for selectively applying rewrite pulses of a predetermined polarity to the matrix memory elements and to said second winding of the auxiliary element, said rewrite pulses being spaced separately in time from said read pulses, said inhibit wire supplying pulses to said inhibit windings dependent on the information read out by said read pulses and supplied to the first winding of said auxiliary element.

2. A magnetic memory system comprising a plurality of magnetic matrix memory elements arranged in a matrix including rows and columns, each matrix memory element being capable of assuming at least two stable magnetic states, each matrix memory element having magnetically coupled thereto a plurality of windings comprising read, write and inhibit windings, an auxiliary magnetic memory element, said auxiliary element having magnetically coupled thereto a first winding and a second winding, said first winding being coupled to a read wire connecting all of said read windings, said second winding being coupled to an inhibit wire connecting all of said inhibit windings, said second winding being shunted by an output impedance, means for selectively applying read pulses of a predetermined polarity to the matrix memory elements for reading out the information stored therein, means for selectively applying rewrite pulses of a predetermined polarity to the matrix memory elements and to said second winding of the auxiliary element, said rewrite pulses being spaced separately in time from said read pulses, said inhibit wire supplying pulses to said inhibit windings dependent on the information read out by said read pulses and supplied to the first winding of said auxiliary element, output pulses being supplied to said output impedance dependent on the information read out by said read pulses.

3. A magnetic memory system comprising a plurality of magnetic matrix memory elements arranged in a matrix including rows and columns, each matrix memory element being capable of assuming at least two stable magnetic states, each matrix memory element having magnetically coupled thereto a plurality of windings comprising read, write and inhibit windings, an auxiliary magnetic memory element, said auxiliary element having magnetically coupled thereto a first winding and a second winding, said first winding being coupled to a read wire connecting all of said read windings, said second winding being coupled to an inhibit wire connecting all of said inhibit windings, reading means for selectively applying read pulses of a predetermined polarity to the matrix memory elements for reading out the information stored therein, said reading means comprising a shift register having a plurality of bistable units, each unit corresponding with one column of said matrix and being connected in series with the write windings of the memory elements of said column, means for selectively applying rewrite pulses of a predetermined polarity to the matrix memory elements and to said second winding of the auxiliary element, said rewrite pulses being spaced separately in time from said read pulses, said inhibit wire supplying pulses to said inhibit windings dependent on the information read out by said read pulses and supplied to the first winding of said auxiliary element.

4. A magnetic memory system comprising a plurality of magnetic matrix memory elements arranged in a matrix including rows and columns, each matrix memory element being capable of assuming at least two stable magnetic states, each matrix memory element having magnetically coupled thereto a plurality of windings comprising read, write and inhibit windings, an auxiliary magnetic memory element, said auxiliary element having magnetically coupled thereto a first winding and a second winding, said first winding being coupled to a read wire connecting all of said read windings, said second winding being coupled to an inhibit wire connecting all of said inhibit windings, reading means for selectively applying read pulses of a predetermined polarity to the matrix memory elements for reading out the information stored therein, said reading means comprising a shift register having a plurality of bistable units, each unit corresponding with one column of said matrix and being connected in series with the write windings of the memory elements of said column, rewrite means for selectively applying rewrite pulses of a predetermined polarity to the matrix memory elements and to said second winding of the auxiliary element, said rewrite means comprising a shift register having a plurality of bistable units, each unit corresponding with one column of said matrix and being connected in series with the write windings of the memory elements of said column, said rewrite pulses being spaced separately in time from said read pulses, said inhibit wire supplying pulses to said inhibit windings dependent on the information read out by said read pulses and supplied to the first winding of said auxiliary element.

5. A magnetic memory system comprising a plurality of magnetic matrix memory elements arranged in a matrix including rows and columns, each matrix memory element being capable of assuming at least two stable magnetic states, each matrix memory element having magnetically coupled thereto a plurality of windings comprising read, write and inhibit windings, an auxiliary magnetic memory element, said auxiliary element having magnetically coupled thereto a first winding and a second winding, said first winding being coupled to a read wire connecting all of said read windings, said second winding being coupled to an inhibit wire connecting all of said inhibit windings, said second winding being shunted by an output impedance, reading means for selectively applying read pulses of a predetermined polarity to the matrix memory elements for reading out the information stored therein, said reading means comprising a shift register having a plurality of bistable units, each unit corresponding with one column of said matrix and being connected in series with the write windings of the memory elements of said column, rewrite means for selectively applying rewrite pulses of a predetermined polarity to the matrix memory elements and to said second winding of the auxiliary element, said rewrite means comprising a shift register having a plurality of bistable units, each unit corresponding with one column of said matrix and being connected in series with the write windings of the memory elements of said column, said rewrite pulses being spaced separately in time from said read pulses, said inhibit wire supplying pulses to said inhibit windings dependent on the information read out by said read pulses and supplied to the first winding of said auxiliary element, output pulses being supplied to said output impedance dependent on the information read out by said read pulses.

References Cited by the Examiner

UNITED STATES PATENTS

| | | | |
|---|---|---|---|
| 2,939,114 | 5/1960 | Bobeck et al. | 340—174 |
| 3,015,808 | 1/1962 | DeTroye | 340—174 |
| 3,054,989 | 9/1962 | Melmed et al. | 340—174 |
| 3,069,660 | 12/1962 | Wright et al. | 340—174 |
| 3,075,183 | 1/1963 | Warman et al. | 340—174 |
| 3,174,137 | 3/1965 | Khambaty et al. | 340—174 |

BERNARD KONICK, *Primary Examiner.*

IRVING SRAGOW, JOHN F. BURNS, *Examiners.*

H. D. VOLK, R. R. HUBBARD, *Assistant Examiners.*